Patented Jan. 17, 1939

2,144,455

UNITED STATES PATENT OFFICE 2,144,455

KETO CARBOXYLIC ACID ESTERS AND PROCESS OF MANUFACTURE

Ivan Gubelmann, Wilmington, Del., assignor to E. I. du Pont de Nemours & Company, Wilmington, Del., a corporation of Delaware No Drawing. Application March 24, 1938, Serial No. 197,962

8 Claims. (Cl. 260—469)

This invention relates to new chemical compounds. More especially it relates to new keto carboxylic acid esters, which are useful in the field of synthetic resins and elsewhere.

In the copending application of Sachs Ser. No. 197,869, filed March 24, 1938 there is disclosed and claimed a group of new keto carboxylic acids having the general formula

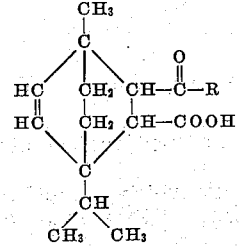

wherein R is an aryl radical.

It is an object of this invention to prepare new organic chemical compounds. It is a further object to prepare new keto carboxylic acid esters. A still further object is to prepare esters of the above described acids.

These objects are accomplished by reacting the above described keto carboxylic acids with alcohols, preferably in the presence of an esterification catalyst.

The following example, in which the quantities of materials are specified as parts by weight, is set forth by way of specific illustration but the invention is not limited thereto as will become more fully apparent hereinafter.

Example

A keto carboxylic acid of the formula

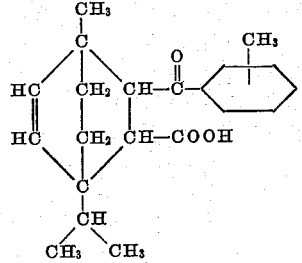

in the amount of 400 parts is added to 800 parts of normal butyl alcohol at room temperature and the mass is saturated with hydrogen chloride gas and refluxed for four hours. The product is first washed with water, then with dilute caustic solution, then with water again. The excess butyl alcohol and water are removed by vacuum distillation. The remaining product is a viscous oil soluble in the usual organic solvents.

The keto carboxylic acids suitable for the process of the invention are those of the general formula given above in which R is an aryl radical, such, for example, as phenyl, naphthyl or anthracyl. This radical may be substituted or unsubstituted. Preferably R is a radical of a member of the benzene series. By way of specific example may be mentioned phenyl, tolyl, xylyl, chloro and bromo phenyl, methoxy phenyl, ethoxy phenyl, naphthyl, anthracyl, etc.

Any alcohol is suitable for the process of the present invention. The preferred alcohols are primary and secondary monohydric, and unsubstituted and substituted polyhydric alcohols. By way of specific examples may be mentioned methyl, ethyl, propyl, butyl, amyl, benzyl and bornyl alcohols, ethylene glycol, propylene glycol, glycerol, glyceric monochlor hydrin, glyceric monoethyl ether, glycol mono alkyl ethers, etc.

The process of preparing the esters may be varied within wide limits of temperature and pressure. Where low boiling alcohols are reacted, somewhat elevated pressure during the esterification is advantageous. While it is preferred to use an esterification catalyst such, for example, as dry hydrogen chloride, sulfuric acid, para toluene sulfonic acid, etc., the process may be carried out in the absence of a catalyst.

The new keto carboxylic acid esters obtained by this invention are useful as resins, plastic masses or softeners. By systematic variation of the aromatic radical and/or the alcohol component, the physical properties of the final products may be changed within wide limits.

Suitable changes may be made in the details of the process and any modifications or variations which conform to the spirit of the invention are intended to be included within the scope of the claims.

I claim:

1. A chemical compound of the formula

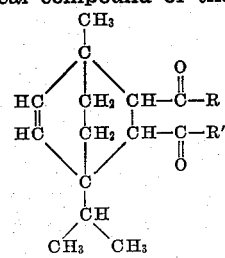

wherein R is aryl and R' is an esterification residue of an alcohol.

2. A chemical compound of the formula

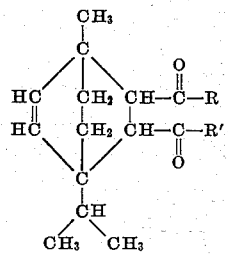

wherein R is an aryl radical of the benzene series and R' is an esterification residue of a primary monohydric alcohol.

3. A chemical compound of the formula

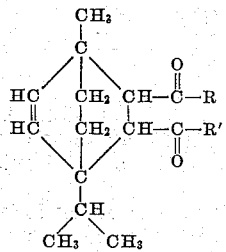

wherein R is an aryl radical of the benzene series and R' is an esterification residue of a secondary monohydric alcohol.

4. A chemical compound of the formula

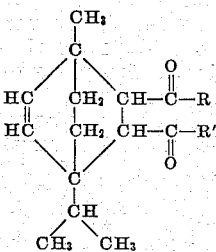

wherein R is an aryl radical of the benzene series and R' is an esterification residue of a polyhydric alcohol.

5. The process which comprises reacting an alcohol with a keto carboxylic acid of the formula

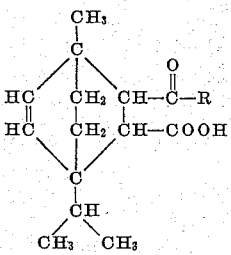

wherein R is aryl.

6. The process which comprises reacting a primary monohydric alcohol with a keto carboxylic acid of the formula

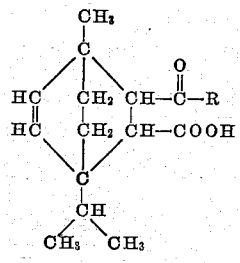

wherein R is an aryl radical of the benzene series.

7. The process which comprises reacting a secondary monohydric alcohol with a keto carboxylic acid of the formula

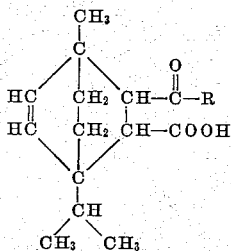

wherein R is an aryl radical of the benzene series.

8. The process which comprises reacting a polyhydric alcohol with a keto carboxylic acid of the formula

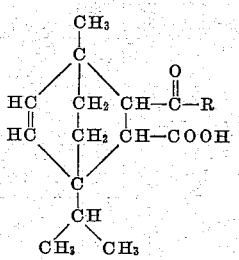

wherein R is an aryl radical of the benzene series.

IVAN GUBELMANN.